April 15, 1952 W. D. MOORE 2,592,941
APPARATUS FOR DETERMINING LOCATION OF
BUBBLES IN TUBES IN LEVEL INSTRUMENTS
Filed Sept. 3, 1949 4 Sheets-Sheet 1
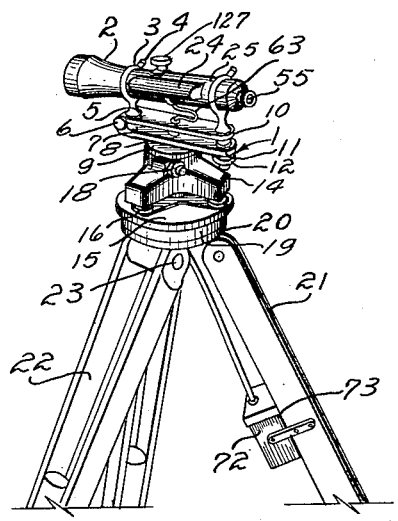
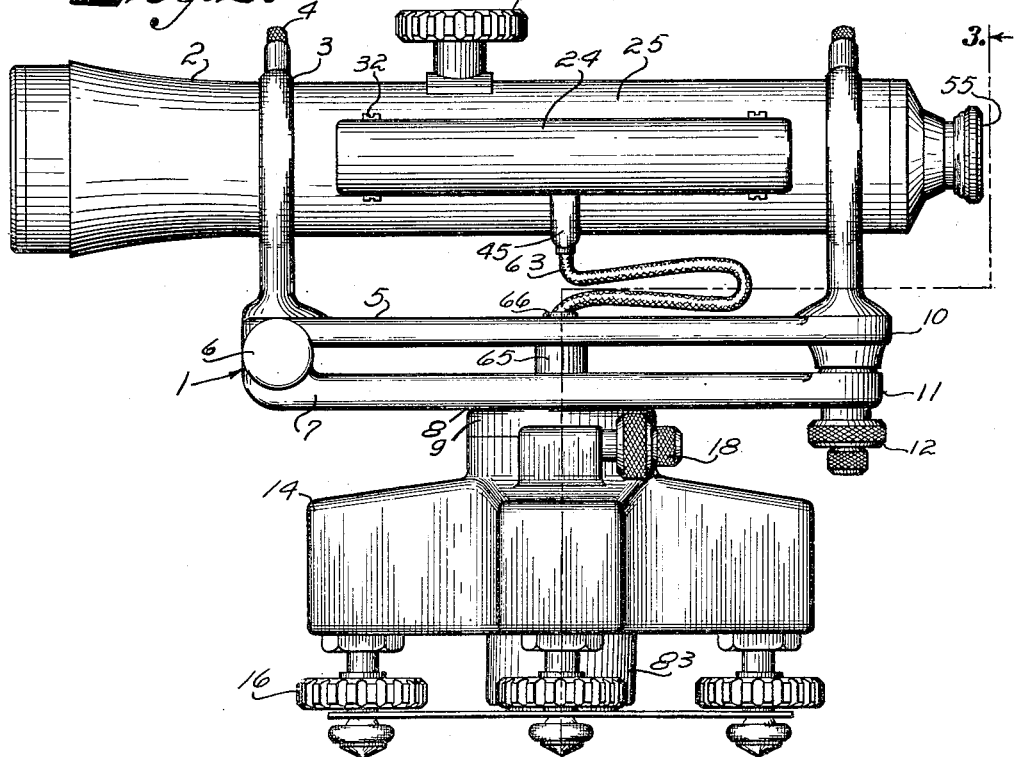
Inventor
William D. Moore
By
Fishburn + Mullendore
Attorneys

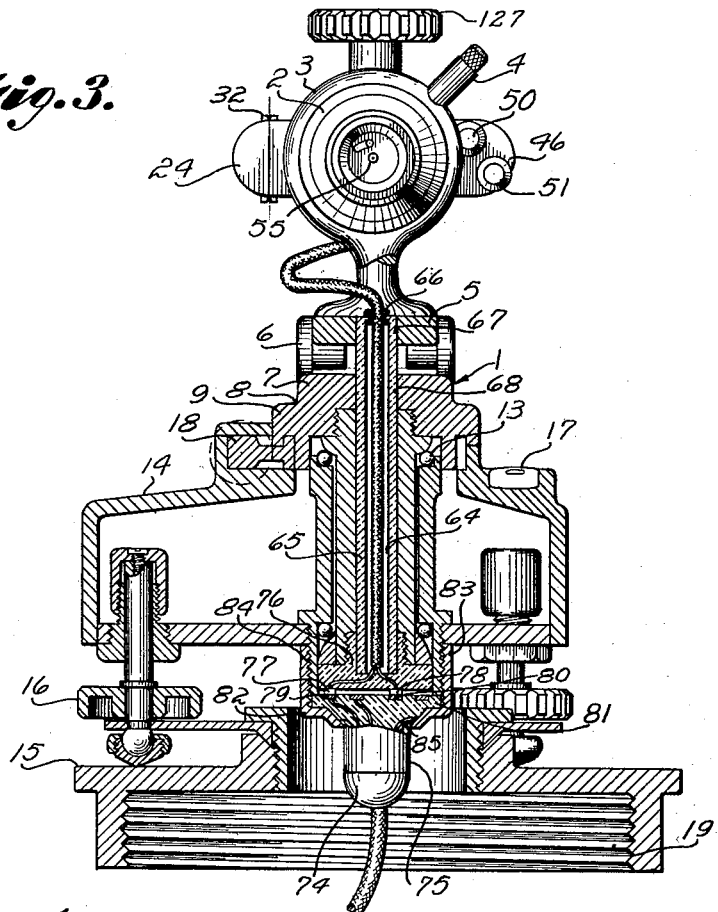
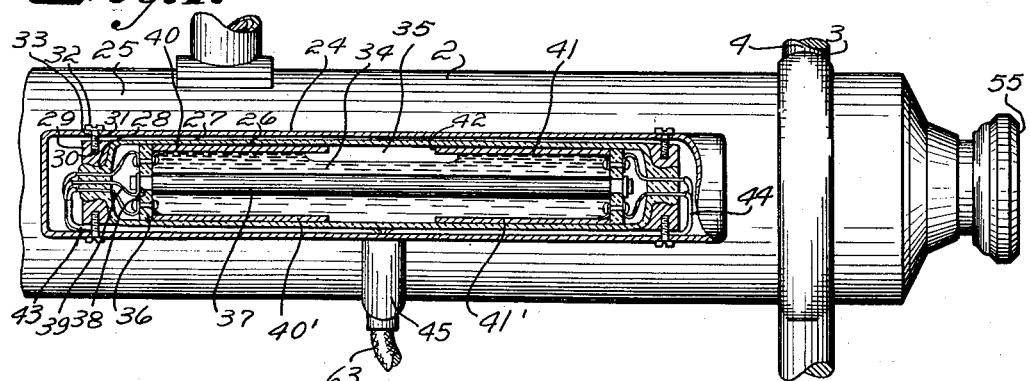

April 15, 1952  W. D. MOORE  2,592,941
APPARATUS FOR DETERMINING LOCATION OF
BUBBLES IN TUBES IN LEVEL INSTRUMENTS
Filed Sept. 3, 1949  4 Sheets-Sheet 3
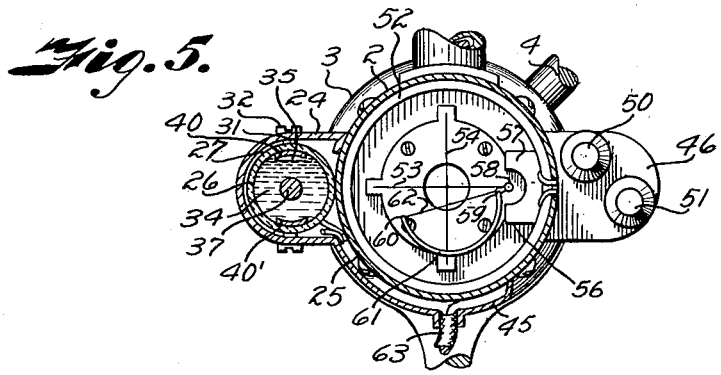
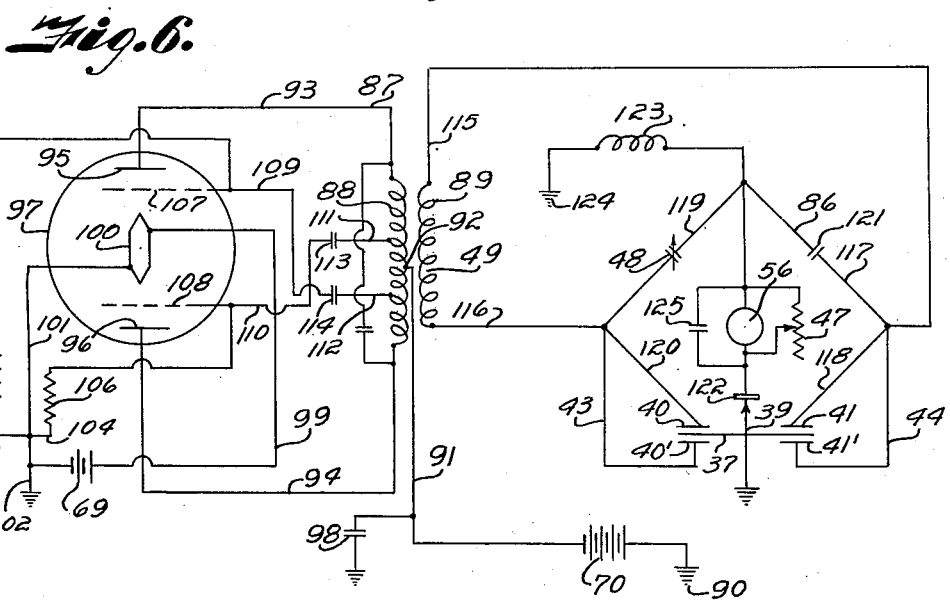
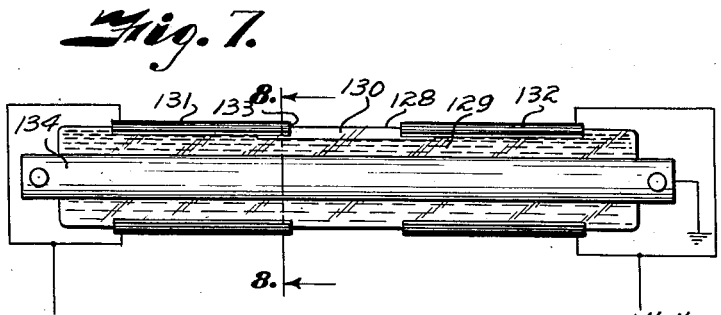
Inventor
William D. Moore
By Fishburn & Mullendore
Attorneys April 15, 1952 W. D. MOORE 2,592,941
APPARATUS FOR DETERMINING LOCATION OF
BUBBLES IN TUBES IN LEVEL INSTRUMENTS
Filed Sept. 3, 1949 4 Sheets-Sheet 4
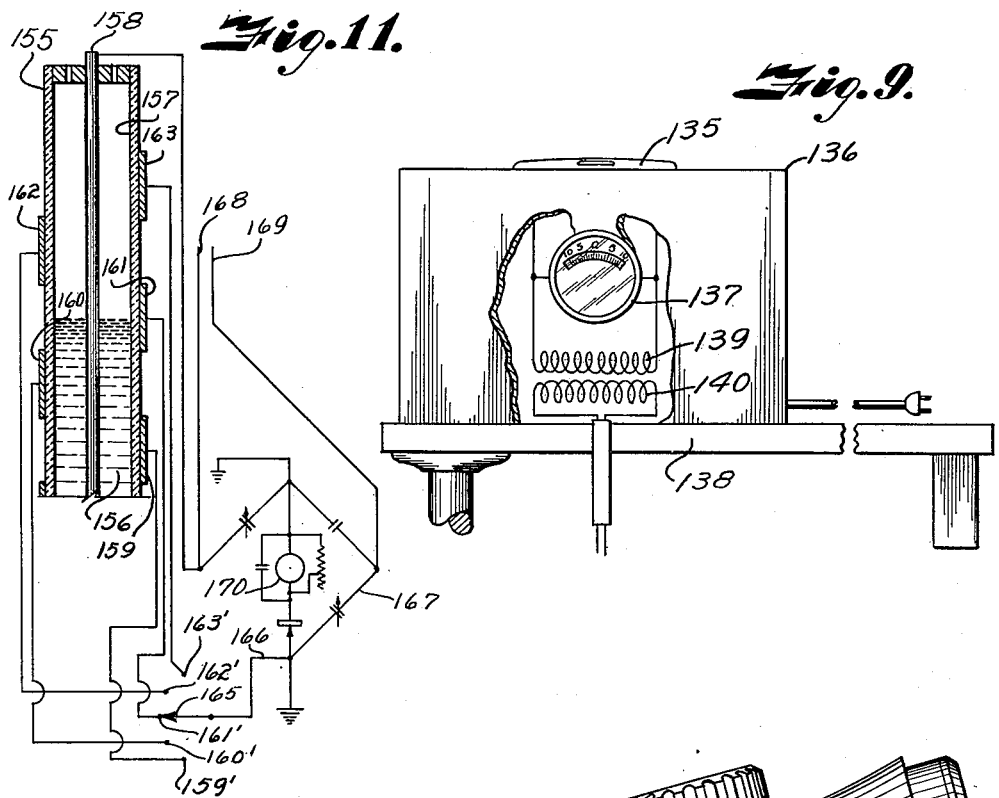
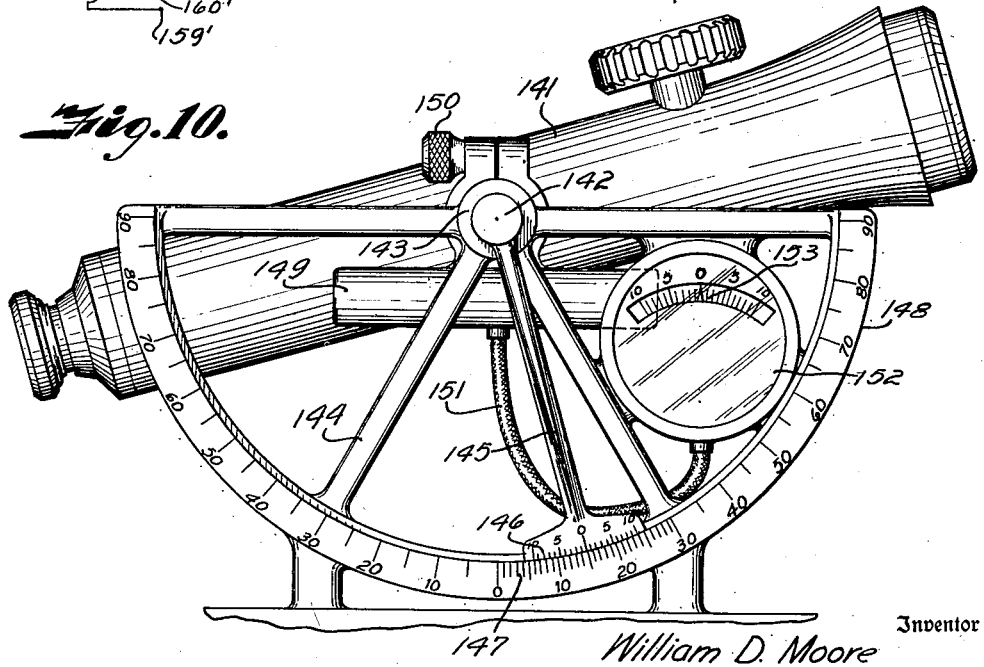
Inventor
William D. Moore
By Fishburn + Mullendore
Attorneys Patented Apr. 15, 1952

2,592,941

UNITED STATES PATENT OFFICE 2,592,941

APPARATUS FOR DETERMINING LOCATION OF BUBBLES IN TUBES IN LEVEL INSTRUMENTS

William D. Moore, Kansas City, Mo., assignor to Brunson Instrument Company, Inc., Kansas City, Mo., a corporation of Missouri Application September 3, 1949, Serial No. 114,043

8 Claims. (Cl. 33—70)

This invention relates to apparatus for determining location of bubbles and/or liquid levels in vials or tubes such as are used in level instruments for indicating angular measurement, tilted and/or level conditions, and more particularly to such an instrument in which the relative position of said bubble and/or level is accurately determined and indicated by electric or electronic circuits and instruments.

Conventional levels, such as are used by engineers, surveyors, and the like, and also simple levels such as are used by carpenters, brick layers and the like, have vials or tubes usually formed of glass and containing a liquid therein. There is usually sufficient liquid in the vial to provide a gas gubble of substantially desired volume whereby when the vial is in level position the extremities or ends of the gas bubble are substantially in alignment with lines or calibrations on the vial. The user can adjust the instrument whereby the position of the bubble is such that it indicates approximately level. On engineers' levels the vial is usually placed under the telescope and the user must stand at the side of the instrument and manipulate the leveling screws until the bubble appears to be centered relative to the calibrations, but when the user looks through the telescope merely moving around the device or placing his hand on the support or other parts of the device can move same from level position contributing to errors in reading as well as considerable time in moving from one position to another to check the level and make the sight.

The objects of the present invention are to provide a tube having liquid therein and electrically operated apparatus for indicating the location of the liquid level; to provide an instrument having a vial of liquid with a bubble therein and electrically operated apparatus to determine the location of the bubble and indicate when said position is within desired limits of level condition; to provide apparatus for determining position of a bubble in a vial and indicating said position on a meter remote from said vial; to provide apparatus for electronically determining relative movement of a bubble in a vial for indicating the angular movement of said vial; to provide a meter operable in response to change in balance of an electric circuit effected by movement of the bubble to indicate relative position or movement of said bubble; to provide a meter in a telescope of a level with a wire or hair movable in response to change of position of the bubble to align with the cross hair or other index lines of said telescope when said bubble is in level position, whereby the level indicating device is in the sight of the user looking through said telescope; to provide apparatus for electronically determining and indicating the level position of a bubble of a level instrument and permit inversion of said instrument; to provide an electronic circuit with an indicator of variable sensitivity for determining and indicating when the bubble is within certain limits of level position for fast reading of desired accuracy; and to provide a level instrument with a head having detachable electric connections for supplying current from a source on the tripod to the electronic instrument for determining and indicating the position of the bubble in a vial adjustably carried on the telescope.

In accomplishing these and other objects of the present invention, I have provided improved details of structure, the preferred forms of which are illustrated in the accompanying drawings, wherein:

Fig. 1 is a perspective view of an engineer's level and tripod, said level embodying the features of the present invention.

Fig. 2 is a side elevation of the level head and telescope.

Fig. 3 is a transverse sectional view through the level head on the line 3—3, Fig. 2, said head being illustrated as being mounted on a base adapted to be threaded on a tripod.

Fig. 4 is a longitudinal sectional view through the level vial, particularly illustrating the position of the electrodes therein.

Fig. 5 is a transverse sectional view through the telescope, particularly illustrating the level indicating hair and the cross hairs in the telescope.

Fig. 6 is a wiring diagram of the electronic apparatus for determining the position of the bubble.

Fig. 7 is a modified form of level vial and electrodes.

Fig. 8 is a transverse sectional view through the modified form of vial on the line 8—8, Fig. 7.

Fig. 9 is a diagrammatic view of an angle measuring device with control.

Fig. 10 is a side elevation of another form of angle measuring device.

Fig. 11 is a diagrammatic view of an electronic apparatus for determining the location of the liquid level in a liquid container.

Referring more in detail to the drawings:

I designates an engineer's level, the construction of which is described for the purpose of illustration as representing an example of an instrument to which my invention may be applied. The engineer's level includes a telescope 2 mounted in spaced bearings 3 for rotation about an axis coinciding with the line of sight of said telescope. The spaced bearings 3 preferably include a latch 4 for securing the telescope in selected position and preventing rotation of same in the bearings. The bearings 3 are preferably arranged at opposite ends of a bar 5, one end of which is pivotally mounted as at 6 to an upper plate 7 secured as at 8 on the upper end of a spindle 9. The opposite ends 10 and 11 of the bar 5 and plate 7 respectively are provided with adjusting screw assembly 12 opposite the hinge 6 whereby turning of the screw tilts the bar 5 and telescope 2 relative to the plate 7. The spindle 9 is rotatably mounted on antifriction or other suitable bearings 13 in a leveling head 14.

The leveling head is supported on a foot plate 15 by a plurality of leveling screws 16 for adjusting the position of the leveling head and instruments for all horizontal positions of the telescope as indicated by a spirit level 17 suitably mounted on the leveling head 14 as illustrated in Fig. 3. A clamping device 18 is provided on the leveling head and adapted to engage a portion of the upper plate for controlling the rotation of the spindle 9 relative to the leveling head 14 as in conventional practice. The foot plate 15 is provided with an internally threaded depending flange 19 threaded onto the upper member 20 of a tripod 21 to secure the instruments thereto, said tripod having legs 22 pivotally mounted as at 23 on said upper member 20, as in conventional practice.

A casing 24 is suitably fixed relative to the telescope 2 for movement therewith, this casing preferably being water and dustproof. The casing is illustrated as being mounted on the side of the wall 25 of the telescope and is hollow to receive a level vial 26 which is of elongated tubular structure preferably formed of glass or other suitable non-conductor of electricity. The relative shape of the casing 24 and vial 26 is such that the walls thereof are spaced as at 27. The ends of the vial are closed as at 28 and are preferably mounted in blocks 29 having threaded bores 30 adapted to receive the shanks 31 of adjusting screws 32, the shanks 31 extending through apertures 33 in the wall of the casing 24 whereby rotation of the screws 32 adjusts the position of the vial relative to the casing to parallel relationship with the line of sight of the telescope 2. Use of two screws 32 at each end of the vial provides a structure which locks the vial in adjusted position.

The vial 26 is filled with a suitable liquid 34 to provide a gas bubble 35 whereby said gas bubble will move in the vial in response to tilting movement of the telescope and will be centrally positioned when the telescope and vial are in level position. In the structure illustrated in Fig. 4 there are partitions 36 spaced from the closed ends 28 of the vial, said partitions preferably being formed of insulating material. Supported in the partitions coaxial with the walls of the vial is an electrode 37, the ends of said electrode extending through and being supported by the partitions 36 and rigidly secured thereto by suitable fastening means 38, one end of said electrode 37 being connected to a conductor 39 which extends through the adjacent closed end of the vial and is connected to a suitable ground of a circuit later to be described. Suitably mounted on the partitions above the electrode 37 and substantially in a vertical plane therewith are electrodes 40 and 41, said electrodes preferably being in contact with the walls of the vial and extending from each of the partitions 36 toward the longitudinal center of said vial, said electrodes terminating as at 42 whereby the spacing between the adjacent ends of said electrodes is of less length than the length of the gas bubble 35, as illustrated in Fig. 4. Identical electrodes 40' and 41' are mounted on the partitions below the electrode 37 in vertical alignment therewith, the spacing of the electrodes 40' and 41' and the spacing from the electrode 37 being substantially the same as the corresponding spacing of electrodes 40 and 41.

The electrodes 40 and 40' are suitably connected in parallel circuit with a conductor 43 and the electrodes 41 and 41' connected in parallel circuit with a conductor 44, said conductors extending through the closed ends 28 of the vial for connection in an electric circuit as later described. The conductors 39, 43 and 44 are preferably enclosed in a cable or otherwise suitably insulated from the metallic members of the instrument, said cables preferably being enclosed by a conduit 45 leading to a housing 46 which encloses a variable resistance 47, variable condenser 48, a transformer 49 and other electrical equipment later described in connection with the electric circuit. The housing 46 is illustrated as being suitably mounted on the opposite side of the telescope to the casing 24. However, said housing may be positioned anywhere on the instrument to provide for convenient access to control knobs or the like 50 and 51 arranged exteriorly of said housing and having suitable connection with the variable resistance 47 and variable condenser 48 respectively for adjusting same.

The telescope 2 is tubular as in conventional structures and has a conventional frame 52 therein secured to the wall 25, said frame supporting the usual horizontal and vertical cross hairs 53 and 54 respectively whereby the point of intersection of said hairs is in the line of sight from the eye piece 55 of said telescope. A suitable meter 56 may be arranged at any location remote from the vial, but in the illustrated engineer's level is enclosed in the telescope and secured to the wall 25 thereof adjacent the frame 52, said meter having electromagnets 57 energized by the electric circuit for rotating an armature 58. An arm 59 is fixed to the armature 58 and extends therefrom terminating as at 60 on the opposite side of the line of sight of the telescope. The intermediate portion 61 of the arm is preferably arcuate in shape whereby a cross hair 62 secured to the portion of the arm adjacent the armature extends in a straight line across the line of sight of said telescope and is secured to the end 60. The curvature of the arm 59 is such that when the cross hair 62 aligns with the cross hair 53 the intermediate portion 61 of said arm is out of the area visible to the person sighting through the telescope but is small enough that when the arm is moved from horizontal alignment with the cross hair 53, as illustrated in Fig. 5, there is sufficient clearance between the arm 59 and the wall 25.

The conductors leading from the power supply and to the housing 46 are preferably enclosed in a cable 63 which extends through a bore 64 in an insulating tube 65 suitably secured in the spindle 9, the upper end of the tube 65 preferably having a rubber or like bushing 66 to protect the cable from the edges of said tube. The insulating tube is illustrated as extending through an aperture 67 in the bar 5 and an aperture 68 in the upper plate 7 to protect the cable from wear by contact with the other members of the instrument during use. The cable and the conductors therein lead to suitable A batteries 69 and B batteries 70 enclosed in a suitable housing 72 located on the apparatus for convenience in carrying, said housing preferably being mounted as at 73 on one of the legs 22 of the tripod as illustrated in Fig. 1.

A suitable connection between the portions of the cable is provided to permit the easy removal of the foot plate 15 from the upper end of the tripod. The connection consists of male and female members 74 and 75, one being connected to the cable leading from the batteries and the other being mounted on the leveling head. It is also desirable that the electrical connections do not interfere with relative rotation of the spindle 9 and leveling head 14. Therefore, the insulating tube 65 terminates at its lower end in a block 76 of insulating material having contacts 77 and 78 arranged at different radial distances from the axis of rotation of the spindle 9, said contacts being electrically connected to the conductors in the cable 63. The contacts 77 and 78 have sliding engagement with conductor rings 79 and 80 respectively mounted in insulating material of the connector member 75, said rings having electric connection through the members 74 and 75 to the conductors leading to the batteries when the members 74 and 75 are engaged. The member 75 is provided with a flange 81 engaged by an inturned flange 82 on a nut 83 threadedly secured to a depending tubular wall 84 on the leveling head 14 whereby the nut 83 retains the rings 79 and 80 in engagement with the contacts 77 and 78. The member 75 is illustrated as having a conductor 85 in electrical contact with the nut 83 and connected through the members 74—75 and cable to the ground terminals of the batteries whereby the ground connection of the electrode 37 and from electrical apparatus in the housing 46 may be connected to the metallic members of the telescope to form a complete circuit. However, a third ring and contact with suitable conductors could be arranged to complete the circuit without grounding same to any portion of the instrument.

The electrical apparatus illustrated in Fig. 6 consists primarily of an impedance measuring circuit such as a bridge circuit 86 having a suitable source of electrical energy whereby the meter 56 or null indicator indicates when the bridge circuit is in balanced condition, the armature arm 59 moving to position the cross hair 62 in alignment with the cross hair 53 when such balanced condition is obtained, the cross hairs being out of alignment when the bridge circuit is not in balance. However, other circuits may be used that will compare or measure relative impedance or capacitance in portions of a vial of liquid to indicate accurately the position of the bubble therein. A suitable arrangement for supplying electrical energy to the bridge circuit is illustrated in Fig. 6, wherein an oscillator circuit 87 is inductively coupled by means of the transformer 49 with the bridge circuit 86, said transformer having a winding 88 in the oscillator circuit, and a winding 89 in the bridge circuit. The B battery 70 has one side suitably grounded as at 90 and is connected by a conductor 91 with a center tap 92 on winding 88, the ends of said winding being connected by conductors 93 and 94 to supply current to the plates 95 and 96 of a twin triode tube 97. The conductor 91 has a connection with a condenser 98, the other side of which is grounded. The A battery 69 has one side connected by a conductor 99 with the filament 100 of the triode tube. The other side of the battery 69 is connected by a conductor 101 with the filament 100, said conductor 101 also being provided with a ground connection 102. Connected with the conductor 101 are conductors 103 and 104 having resistances 105 and 106 respectively, and connected to grids 107 and 108 respectively. Also connected to the grids are conductors 109 and 110 which are connected by taps 111 and 112 with the coil 88, said conductors having condensers 113 and 114 respectively therein.

The oscillator circuit arranged as described induces an alternating current of suitable voltage in the coil 89 of the transformer 49, the ends of said coil 89 being connected to conductors 115 and 116 respectively, said conductor 115 being connected to the bridge circuit 86 between arms 117 and 118 and the conductor 116 between arms 119 and 120. The arm 117 of the bridge circuit has a condenser 121 of fixed capacity, and the arm 119 the variable condenser 48. The electrodes 41 and 37 with the dielectric liquid in the level vial form a condenser in the arm 118 and the electrodes 40 and 37 with the dielectric liquid of the vial form a condenser in the arm 120. The electrode 37 is connected through a rectifier crystal 122 to one side of the meter 56, the other side of said meter being connected between the arms 119 and 117. A coil 123 has one side connected between the arms 117 and 119 and the other side grounded as at 124. Connected around the meter is a condenser 125 and also connected around the meter is the variable resistance 47, said variable resistance serving as a volume control to vary the sensitivity of the meter. The use of the two electrodes 40 and 40′ connected in parallel in the bridge arm 120 and the two electrodes 41 and 41′ in parallel in the bridge arm 118 with each electrode of each pair in vertical alignment with the electrode 37 permits operation of the instrument with either side of the level vial up, thereby permitting inverting of the instrument. In other words, the telescope may be rotated in the bearings 3 through an arc of 180 degrees providing a check as to the alignment of the vial with the line of sight of the telescope. Small misalignment may be compensated by adjusting the variable condenser 48 by means of knob 51 to bring the cross hair into coinciding relation with the cross hair 53 in both positions of the telescope in the inverting of same.

Tilting of the vial 26 will effect movement of the gas bubble 35. For example, if the eye piece portion of the telescope is lower than the opposite end, the bubble 35 will move toward the electrode 40 effecting a change of position of the liquid and air and since the dielectric constant of the air or gas is small, approximately unity, and the dielectric constant of the liquid is greater than unity, the impedance between the electrode 40 and the electrode 37 will become less than the impedance between the electrode 41 and the electrode 37, effecting an unbalanced condition in the bridge circuit. Moving the telescope by means of adjustment of the leveling screws 16 to bring the bubble back to the position shown in Fig. 4, whereby the same proportions of the electrodes 40 and 41 extend into the bubble, will effect a balanced condition in the bridge circuit. As the bridge circuit becomes balanced the armature 58 rotates to move the cross hair 62 into position to coincide with the cross hair 53.

In using an engineer's level constructed as described, the tripod with the batteries in the case 72 on one of the legs is set up and the foot plate 15 screwed onto the top member 20 of said tripod. The connecting member 74 is connected with the member 75 to complete the circuit from the batteries to the rings 79 and 80 and ground connection 85 whereby the electrical circuit is connected through the contacts 77 and 78 and the metal portions of the leveling head to energize the oscillator circuit and induce the flow of alternating current to the bridge circuit 86. The instrument is then set up in the desired location with the legs of the tripod spread to firmly support the level. The leveling screws 16 are then manipulated while the user observes the spirit vial 17 to form a rapid approximation of level condition of the leveling head and vertical arrangement of the spindle 9. The user then looks through the telescope toward the target and manipulates the adjusting knob 127 to focus the telescope thereon. Then by further adjustment of the leveling screws 16, or for some work adjustment of the screw assembly 12, the telescope is tilted to bring the bubble 35 to level position as illustrated in Fig. 4. As the bubble approaches the level position the impedances between the electrodes 40 and 37, and 41 and 37 operate with the capacities of the condensers 48 and 121 to effect a predetermined relationship in the arms of the bridge circuit. The meter 56 indicates when the balanced condition or null point occurs by moving the armature 58 to align the cross hair 62 with the cross hair 53. Turning the knob 50 to adjust the variable resistance 47 varies the sensitivity of the meter 57 whereby, if desired, the sensitivity of the level is less than the pointing power or accuracy with which the telescope can be resighted in the same direction to the same point, it being possible to secure a sensitivity of less than one-fourth of a second of angular measurement. However, the sensitivity can be adjusted according to the work being done. For example, the resistance 47 may be set whereby the meter indicates a balanced condition within limits of twenty seconds variation, then the adjustments of the leveling screws can be made more rapidly than the fine adjustments required for a low sensitivity. Therefore, the instrument may be adjusted to accommodate it for fast reading of sufficient accuracy for some work or can be adjusted to read with the greatest accuracy necessary.

The alignment of the axis of the vial 26 with the line of sight of the telescope may be checked by inverting the instrument, that is by rotating the telescope through an arc of 180 degrees thereby positioning the vial on the opposite side of the telescope and utilizing the electrodes 40' and 41' on the opposite side of the vial. This arrangement of the vial operates in exactly the same manner and if there is any misalignment the screws 32 may be adjusted to position the vial in proper alignment or the variable condenser 48 may be adjusted to actuate the null indicator at the desired relative impedance or bubble position. Also the telescope may be turned in the opposite direction, that is around a vertical axis by rotating the spindle 9 to check said vertical axis, said rotation not interfering with the conductors leading from the batteries to the oscillator and bridge circuit as the contacts 77 and 78 rotate on the rings 79 and 80 to maintain the electrical circuit.

With the vial constructed as illustrated in Fig. 4, an ordinary direct current bridge circuit may be used if a liquid 34 having the proper D. C. impedance characteristics is used.

In the modified form a vial illustrated in Figs. 7 and 8, a vial 128 of glass or other material is substantially filled with liquid 129 to form a gas bubble 130 therein. Suitably secured on the vial in engagement with the exterior surface thereof and adjacent the ends are electrodes 131 and 132, the electrodes at like ends being connected in parallel in the same manner as the electrodes 40—40' and 41—41'. The inner ends of the electrodes 131 and 132 extend toward the longitudinal center of the vial terminating as at 133 in spaced relation, said space being less than the length of the bubble 130. Extending for the full length of the vial and on diametrically opposite sides thereof and equally spaced from electrodes 131 and 132 are electrodes 134 whereby the glass or other material of the vial and the liquid combine to form the dielectric to provide the capacity at each end of the vial.

In using a vial constructed as described, electrodes 131 are connected in the bridge circuit in the same manner as the electrodes 40 and 40' and electrodes 132 connected in the same manner as the electrodes 41 and 41'. The electrodes 134 are connected in the same manner of the electrodes 37. In this arrangement the operation is substantially the same and the instrument may be inverted as the various electrodes are in duplicate in the same manner as described in connection with the circuit in Fig. 6.

In the form of the invention illustrated in Fig. 9 the vial 135 is supported on a housing 136 which encloses the electrical apparatus supplied by current from a suitable source of supply. The electrical circuit may be similar to that illustrated in Fig. 6 or other suitable circuit to energize a meter 137 graduated in increments of angular measurement whereby when the housing 136 is mounted on a support 138, the angle of slope of said support may be measured. The instrument may also be used to control the level of a support by use of a suitable transformer having a winding 139 in parallel circuit with the meter and a secondary coil 140 connected to a suitable electrical circuit including relays, motors and the like for raising and lowering the support to maintain same in level condition.

In the form of the invention illustrated in Fig. 10, the telescope or other device 141 has trunnions 142 rotatably mounted in suitable bearings 143 carried on a frame 144. Fixed to the trunnion is an arm 145 having graduations 146 adapted to coincide with graduations 147 of a semicircular member 148, the graduations 146 serving as a vernier and being in increments of angular measurement whereby the angle of tilt of the telescope 141 may be measured. The level vial is supported in a housing 149 rotatable about the trunnion 142, a clamping device 150 being provided to lock the level in its correct position relative to the trunnion. The level vial is of the same construction as illustrated in Fig. 4 or Fig. 7 and has a conduit 151 leading to a suitable electric circuit having a power supply and a meter 152, said meter being graduated in increments of angular measurement whereby tilting of the vial will be indicated thereon. With this arrangement the telescope 141 may be rotated through a substantially desired angle indicated by the graduations 146 and 147. The clamping device 150 is loosened and the level vial rotated until the hand 153 of the meter is at zero. That indicates that the level vial is level. Then by tightening the screws of the clamp 150, any further angular movement of the telescope may be indicated directly on the meter 152.

In the form of the invention illustrated in Fig. 11, a tube 155 preferably formed of a suitable nonconductor of electricity is located in or near a body of liquid (not shown) and connected therewith so that the liquid 156 will rise or lower in the bore 157 of the tube in accordance with the elevation of said liquid body. Supported in the tube and preferably coaxial therewith is an electrode 158 which extends into the liquid in the tube. A plurality of electrodes 159, 160, 161, 162 and 163 are mounted on the tube in contact with the walls thereof, said electrodes being spaced and in staggered relation around the tube so adjacent end edges of the electrodes overlap but do not contact. The electrodes 159, 160, 161, 162 and 163 are electrically connected to contacts 159', 160', 161', 162' and 163' respectively of a commutator switch 164, the arm 165 of which is connected in a leg 166 of a suitable bridge or other impedance measuring circuit 167. The electrode 158 is also connected in the same leg 166 of the circuit 167 whereby said electrode 158 and the electrodes 159, 160, 161, 162, and 163 with the liquid 156 therebetween form the impedance to be measured.

The circuit 167 is similar to the circuit 86 and receives electric current from a suitable source of supply connected to conductors 168 and 169, which current actuates a meter 170 in accordance with variation in the impedance of the liquid and gas between the electrodes of the tube 155 in relation to the capacities of condenser 171 and variable condensers 172 and 173 in other legs of the circuit 167. The meter 170 preferably is calibrated in units of linear measurement.

In using apparatus constructed and connected as described, the current is supplied to the circuit 167, then the commutator switch arm 165 is moved to engage contact 159' and if the elevation of liquid is above the upper edge of the electrode 159 the meter will be actuated to show the liquid elevation is at or above the upper limit of the partition of the tube adjacent the electrode 159. The arm 165 is then moved to contact 160' and the switch is preferably marked to indicate the height of liquid at the lower end of electrode 160. The meter will again show that the liquid elevation illustrated is above the upper edge of the electrode in the circuit. The arm 165 is then moved to contact 161' which places the electrodes 161 and 158 in the leg of the circuit 167, and the meter will indicate the height of the liquid by the relative impedance between the electrodes 161 and 158 and the other legs of the circuit which will be determined according to the impedance of the portion of the tube having liquid and the portion having gas between the electrodes 161 and 158. The meter being calibrated in units of linear measurement will show the height of the liquid above the lower edge of the electrode 161 which length is added to the height shown by the position of the arm 165 to give the total height of the liquid elevation in the body of liquid being measured. Obviously the meter and switch could be calibrated in gallons or other liquid measure if desired.

I have illustrated and described the electronic level in connection with an engineer's level and angular measurement devices, however, it is believed obvious that the electrical circuit and the level vial may be used in any instrument for determining level conditions accurately, for example, even in a carpenter's level.

It is believed that I have provided an electronic level wherein the location of the bubble and/or liquid elevation is indicated by movement of an arm of a meter whereby said indication may be remote from the level vial to provide accurate fast readings. Also I have arranged such a meter in the telescope of an engineer's level or the like device wherein the level position may be read at the same time as making the sight.

What I claim and desire to secure by Letters Patent is:

1. Apparatus for determining the position of a bubble in confined liquid comprising, a vial having liquid therein forming a bubble which is centrally located when said vial is level and movable from said central location when the vial is tilted, spaced pairs of electrodes oppositely disposed relative to the level position of the bubble and having adjacent ends overlapping opposite edges of said bubble, the liquid being between the electrodes of each pair, a common electrode between and equally spaced from the electrodes of each pair, an electric circuit connected to the common electrode and pairs of electrodes whereby movement of the bubble varies the impedance in the circuit, and means for measuring the variation in impedance in the electric circuit for indicating extent of movement of the bubble in the vial and accuracy of indication on inversion of the vial.

2. A level of the character described comprising, an elongated vial, liquid in the vial and forming a bubble which is centrally located therein when said vial is level and movable from said position when the vial is tilted, spaced pairs of electrodes respectively aligned and having adjacent portions overlapping opposite ends of the bubble when the vial is in level position, a common electrode spaced from the electrodes of each pair and arranged parallel therewith with the liquid therebetween whereby movement of the bubble varies the impedance between the respective aligned electrodes and said common electrode, a bridge circuit, means connecting one of the pairs of electrodes and the common electrode in one arm of the bridge circuit and the other pair of electrodes and said common electrode in an adjacent arm of said bridge circuit, a null indicator in the bridge circuit, means supplying alternating current to the bridge circuit for actuating the null indicator to indicate when the bubble is in level position, and means in one of the arms of the bridge circuit for adjusting the null point of the circuit relative to the position of the bubble.

3. A level of the character described comprising, an elongated vial, liquid in the vial and forming a bubble which is centrally located therein when said vial is level and movable from said position when the vial is tilted, said liquid having a dielectric constant greater than unity, spaced pairs of electrodes respectively aligned and having adjacent portions overlapping opposite ends of the bubble when the vial is in level position, a common electrode spaced from the electrodes of each pair and arranged parallel therewith with the liquid as a dielectric therebetween whereby movement of the bubble varies the capacitance between the respective aligned electrodes and said common electrode, a bridge circuit, means connecting one of the pairs of electrodes and the common electrode in one arm of the bridge circuit and the other pair of electrodes and said common electrode in an adjacent arm of said bridge circuit, a null indicator in the bridge circuit, means supplying alternating current to the bridge circuit for actuating the null indicator to indicate when the bubble is in level position, and means for varying the sensitivity of the null indicator.

4. A level of the character described comprising, a telescope having cross hairs therein, means for leveling said telescope, an elongated vial adjustably mounted on said telescope parallel to the line of sight thereof, liquid in the vial and forming a bubble centrally located therein when the vial is level and movable from said location when the vial is tilted, an electric circuit, means in said circuit responsive to movement of the bubble in the vial for indicating the relative position of said bubble, and an arm in the telescope and operable by said indicating means to align with the cross hair of said telescope when the bubble is in level position, whereby the level condition is indicated in the telescope while a sight is being made therewith.

5. A level of the character described comprising, a telescope, means for leveling said telescope, an elongated vial adjustably mounted on said telescope parallel to the line of sight thereof, liquid in the vial and forming a bubble which is centrally located therein when the vial is level and movable from said location when the vial is tilted, spaced pairs of elongated electrodes longitudinally of the vial oppositely disposed relative to the level position of the bubble and having adjacent ends overlapping opposite ends of said bubble, the liquid being between the electrodes of each pair, a central elongated electrode equally spaced from and parallel with each electrode of each pair, an electric circuit connected to the central and pairs of electrodes whereby movement of the bubble varies the impedance in the circuit, the electrodes of each pair being in parallel circuit, means for measuring the variation in impedance in the electric circuit for indicating when the bubble is in level position, and means rotatably mounting the telescope for inverting same and the vial thereon whereby the impedance variation measuring means will indicate the parallel relationship of the vial to the line of sight of the telescope.

6. A level of the character described comprising, a telescope having cross hairs therein, means for leveling said telescope, an elongated vial adjustably mounted on said telescope parallel to the line of sight thereof, liquid in the vial and forming a bubble which is centrally located therein when the vial is level and movable from said position when the vial is tilted, a bridge circuit, an indicator connected in the bridge circuit for indicating null point between the arms of said bridge circuit, an arm having a cross hair extending across the line of sight of the telescope and operable by the indicator to position said cross hair in horizontal alignment with the horizontal cross hair of the telescope only at the null point of the bridge circuit, means connected in adjacent arms of said bridge circuit, and on opposite sides of the level position of the bubble whereby movement of the bubble varies the impedance in the respective arms of the bridge circuit, and means in one arm of the bridge circuit for adjusting the null point of the circuit to correspond to the impedance therein when the bubble is in level position.

7. A level of the character described comprising, a telescope having cross hairs therein, means for levelling said telescope, an elongated vial mounted on said telescope parallel to the line of sight thereof, liquid in the vial and forming a bubble which is centrally located therein when the vial is level and movable from said location when the vial is tilted, a bridge circuit connected to a source of electric energy, an indicator connected in the bridge circuit for indicating balance between arms of said bridge circuit, said indicator being mounted inside of the telescope adjacent the cross hairs thereof, an arm having a cross hair extending across the line of sight of the telescope and operated by the indicator to position said cross hair in horizontal alignment with the horizontal cross hair of the telescope when the bridge circuit is balanced and move the arm to disalign the cross hairs when the bridge is unbalanced, aligned electrodes having adjacent portions overlapping the opposite ends of the bubble when the vial is in level position, a common electrode spaced from the aligned electrodes and arranged substantially parallel therewith with the liquid forming an impedance therebetween whereby movement of the bubble varies the impedance between the respective aligned electrodes and the common electrode, and means connecting one of the aligned electrodes and the common electrode in one arm of the bridge circuit and the other aligned electrode and said common electrode in an adjacent arm of said circuit, whereby central location of said bubble effects a balanced condition in said bridge circuit.

8. A level of the character described comprising, a telescope having cross hairs therein, means for leveling said telescope, an elongated vial adjustably mounted on said telescope parallel to the line of sight thereof, liquid in the vial and forming a bubble which is centrally located therein when the vial is level and movable from said location when the vial is tilted, said liquid having a dielectric constant greater than unity, a bridge circuit, a null indicator connected in the bridge circuit for indicating balance between arms of said bridge circuit, said indicator being mounted inside of the telescope adjacent the cross hairs thereof, an arm having a cross hair extending across the line of sight of the telescope and operated by the null indicator to position said cross hair in horizontal alignment with the horizontal cross hair of the telescope when the bridge circuit is balanced and move the arm to disalign the cross hairs when the bridge is unbalanced, batteries for supplying current, an oscillator circuit energized by the batteries for delivering alternating current to the bridge circuit, aligned electrodes having adjacent portions overlapping the opposite ends of the bubble when the vial is in level position, a common electrode spaced from the aligned electrodes and arranged substantially parallel therewith with the liquid as a dielectric therebetween whereby movement of the bubble varies the capacity between the respective aligned electrodes and the common electrode, means connecting one of the aligned electrodes and the common electrode in one arm of the bridge circuit and the other aligned electrode and said common electrode in an adjacent arm of said circuit, whereby central location of said bubble effects a balanced condition in said bridge circuit, and means for varying the sensitivity of the null indicator.

WILLIAM D. MOORE.

REFERENCES CITED

The following references are of record in the file of this patent:

UNITED STATES PATENTS

| Number | Name | Date |
|---|---|---|
| 2,041,526 | Carter | May 19, 1936 |
| 2,252,727 | Pepper | Aug. 19, 1941 |
| 2,350,240 | Leister et al. | May 30, 1944 |
| 2,367,465 | Munzer | Jan. 16, 1945 |

FOREIGN PATENTS

| Number | Country | Date |
|---|---|---|
| 148,635 | Great Britain | July 29, 1920 |